Sept. 14, 1937. H. M. CONNOR ET AL 2,092,956
FRUIT PITTER
Filed May 6, 1936 3 Sheets-Sheet 3
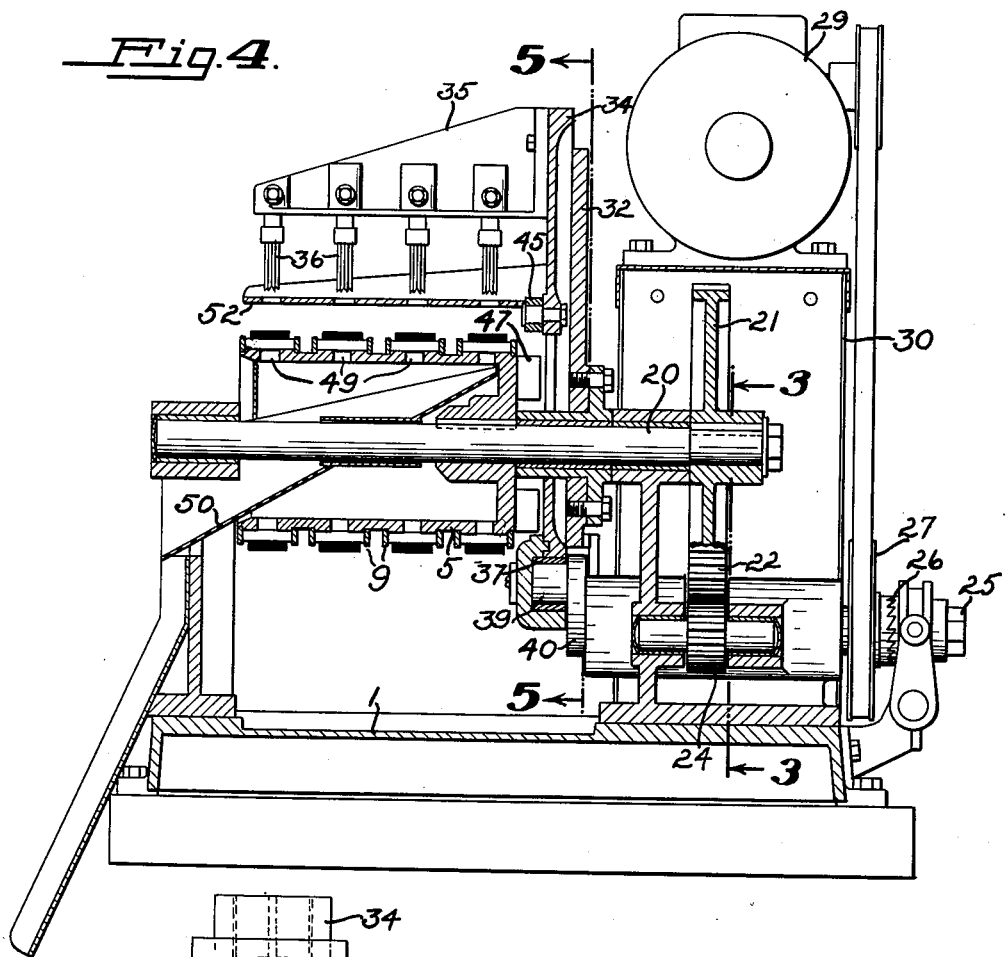
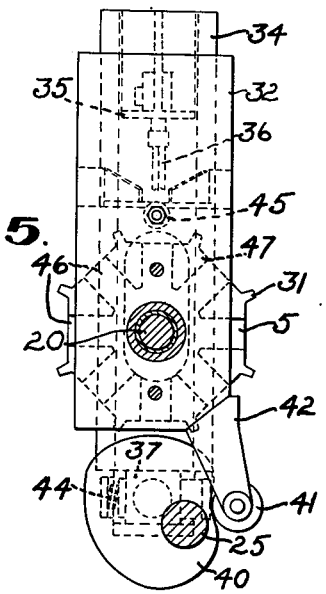
INVENTORS.
HERSCHEL M. CONNOR.
ELLSWORTH W. CARROLL.
BY Lippincott & Metcalf
ATTORNEYS.

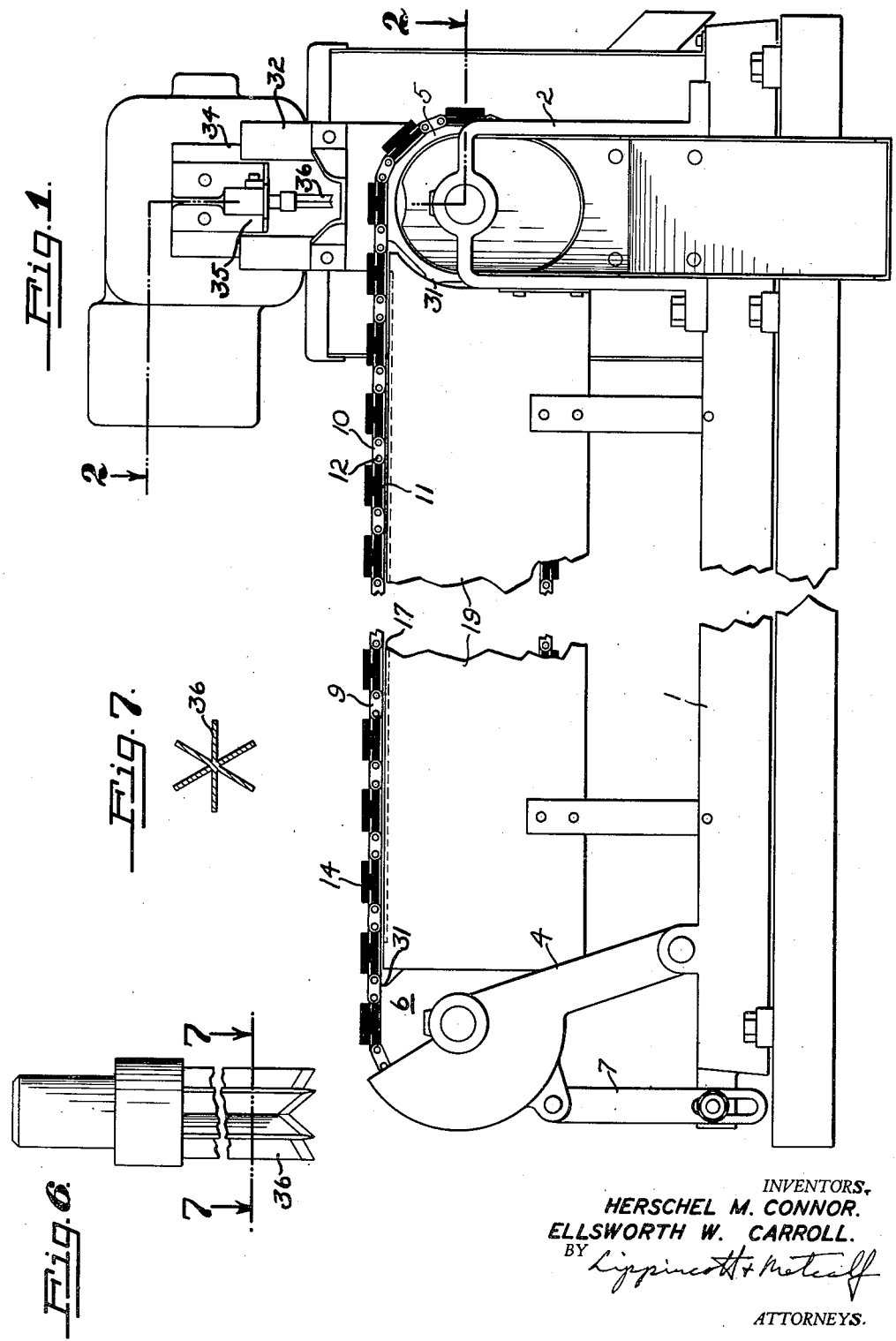

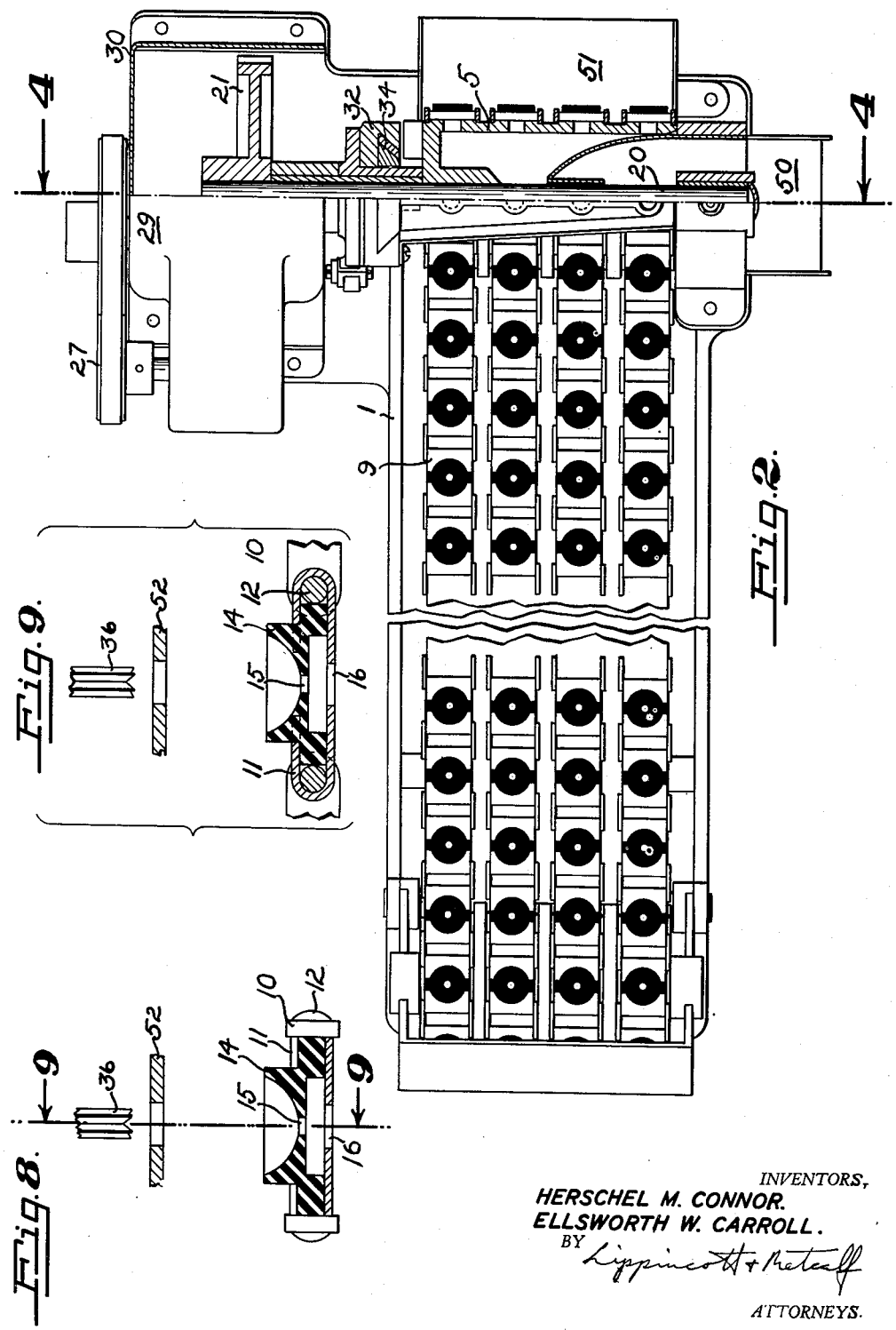

Patented Sept. 14, 1937

2,092,956

UNITED STATES PATENT OFFICE 2,092,956

FRUIT PITTER

Herschel M. Connor and Ellsworth W. Carroll, San Francisco, Calif., assignors to Sussman Wormser & Co., San Francisco, Calif., a corporation of California Application May 6, 1936, Serial No. 78,192

9 Claims. (Cl. 146—19)

This invention relates to fruit pitters, and particularly to mechanisms for pitting cherries, although it will be obvious that by changing the proportions the same mechanism can be used with larger fruits, as, for example, apricots.

The invention is primarily designed for use in large fruit packing establishments where great numbers of small fruits, such as cherries, are pitted and processed.

Numerous hand machines have been made and used wherein the fruit to be pitted is supported in a rubber carrier or cup, having a hole in the bottom thereof. A knife holder carrying a number of knives or prongs is forced down through the fruit, within which the knives engage the pit and force it out of the stem end through the opening at the bottom of the carrier. In this hand type of device the fruit is placed in the carrier by hand, one at a time, and removed in like manner. Power machines have also been made to operate on this principle, a succession of the carriers being mounted to be carried forward by a drum, positioned thereby beneath the knife as it comes down, and then moved forward to make way for a succeeding carrier beneath the knife. In this type of machine loading is still done by hand but the discharge is automatic. The forward motion of the carrier is intermittent, the carriers being stationary while the actual pitting occurs and then moving forward between the knife strokes. Due to this intermittent motion, the loading of the carrier becomes very difficult. Not only is the jerky motion of the carriers dazzling and hard on the eyes and nerves of the operators who are placing the fruit in the carriers, but if they falter in the rhythm of their loading they will fail to place the fruit properly, and as a consequence there will be not only many empty carriers, reducing the output of the machine far below its theoretical value, but there will also be failures of the machine properly to pit the fruit, either barely knicking the pit or breaking off a portion of it, or turning the pit over within the fruit and failing entirely to remove it. Even where the pit is removed in its entirety, such improper placing may result in serious bruising or mangling of the fruit itself.

The primary object of this invention is to provide a type of pitting mechanism wherein the carriers are moved forward at a constant speed, which may be accurately judged by the operators and which permits them to place the cherries or other products accurately in position, without the strain on eyes or nerves.

Pursuant to this primary objective, objects of the invention are: To provide a means for moving a reciprocating pitting knife forward with the carrier during the portion of the stroke wherein the knife is entering and leaving the fruit, and to move the knife back and into alignment with the succeeding carrier during the remainder of the cycle of reciprocation; to provide a means of rigidly interlocking the knives and carrier in their proper relative positions while the knife is entering and leaving the fruit; to provide a mechanism wherein multiple, or gang, knives may be used, and as many carriers as are requisite to provide the necessary output may be operated in alignment on a single machine; to provide a device wherein the oscillatory and reciprocating movements of the knives are accomplished by the same simple mechanism; to provide a machine wherein the failures to pit properly are reduced to a vanishingly small percentage; and to provide a machine wherein the cleanliness necessary in the handling of food products may be readily achieved.

Our invention possesses numerous other objects and features of advantage, some of which, together with the foregoing, will be set forth in the following description of specific apparatus embodying and utilizing our novel method. It is therefore to be understood that our method is applicable to other apparatus, and that we do not limit ourselves, in any way, to the apparatus of the present application, as we may adopt various other apparatus embodiments, utilizing the method, within the scope of the appended claims.

Referring to the drawings:

Figure 1 is a side elevation of a preferred embodiment of the invention.

Figure 2 is a plan view of the machine, shown in part in section, the plane of section being taken on the line 2—2 of Figure 1.

Figure 3 is a fragmentary view showing schematically the gear train for driving the reciprocating and oscillating elements of the machine.

Figure 4 is a transverse sectional view of the machine, the plane of section being on the line 4—4 of Figure 2.

Figure 5 is a detailed view of the mechanism which advances the carriers, reciprocates the knife holders, and oscillates the guideway in which the knife holders slide during their reciprocating motion. The direction of view is shown by the line 5—5 in Figure 4.

Figure 6 is an elevation on an enlarged scale of a preferred form of knife for use with the machine.

Figure 7 is a sectional view, taken on the line 7—7 of Figure 6, of the knife there shown.

Figure 8 is a detailed view, in somewhat diagrammatic form, showing the relative positions of carrier, knife and stripper plate, at the instant when the knife is at its completely retracted position.

Figure 9 is a similar sectional view, taken in the plane of the line 9—9 of Figure 8, showing the method of connecting the carriers to make continuous chains.

Considered broadly, this invention comprises a series of uniformly spaced carries which may be moved forward at a uniform velocity, and a reciprocating knife holder which is successively moved forward in alignment with a carrier during the period starting with the instant the knife enters the fruit and ending after it has withdrawn, and then oscillating back into alignment with the succeeding carrier, after which the operation is repeated.

In the preferred form of the invention which has been chosen for illustration, a suitable bedplate 1 carries bearing brackets 2 and 4, upon which are journaled a pair of polygonal sprocket drums 5 and 6. The position of the drum 6 may be adjusted by means of the link 7 to keep taut the one or more carrier chains 9.

In the drawings, four of these carrier chains are shown, but it is obvious that as many chains as desired may be used to give the machine the requisite capacity. Each chain consists of alternate connecting links 10 and carrier links 11, connected by the pins 12. In the preferred form of the device each of the links 11 is formed of sheet metal, folded as shown in Figure 9, the ends of the sheet being notched so that when bent back to form the link they encircle the projecting cup of the rubber carrier 14. The aperture or perforation 15 in the bottom of the cup is aligned with an aperture 16 in the bottom of the link, this latter aperture being of sufficient calibre to permit the passage of the largest pit in the fruit it is desired to have the machine handle.

The upper reaches of the chains 9 run along the top of a loading table 17, which holds the chains level and supports the carriers while the cherries or other fruits are being placed within the carrier cups. A skirt or guard 19 is preferably provided to keep the workers from fouling the lower reaches of the chains 9.

Uniform motion is imparted to the carrier chains by means of the drum 5, which acts as a driving sprocket. The drum is keyed to a drive shaft 20 to which is also keyed a drive gear 21, and the latter is driven through an idler pinion 22, which in turn derives its power from a drive pinion 24. The latter is mounted on a crank-shaft 25. In the present instance this shaft is driven by means of a clutch 26 which interlocks with a pulley 27, and the pulley is belt-driven by a motor 29, mounted on a housing 30 which encloses the gears.

Both the driving drum 5 and the idler drum 6 are polygonal in outline and are provided with sprocket teeth 31 which insure positive motion of the chains. The carrier links thus rest solidly on the flat surfaces of the drum during the period when they are passing thereover. The gear ratio between the crank-shaft 25 and the drum-shaft 20 is equal to the number of faces on the polygonal drum. Since the drum here shown has eight faces, the crank-shaft 25 makes eight revolutions with each revolution of the drum.

Journaled upon the shaft 20, so that it may oscillate about the axis of the drum, is a guideway 32, within whose ways slides the knife holder 34. This knife holder includes an overhanging arm 35 which carries the knives 36. Various types of knives may be used, as will be described later, but their spacing along the arm 35 must be equal to the spacing of the chains along the axis of the drum.

At the lower end of the knife holder 34 there is mounted a bearing-block 37 which is itself mounted in ways so that it is capable of a slight sliding movement transverse to the direction of movement of the knife holder itself. The crank 39, mounted upon the crank-shaft 25, is journaled in this bearing-block. A cam 40 forms the lever arm of this crank, the pin 39 being set therein in the obvious manner. Against this cam 40 there bears the roller follower 41, carried by a lug 42, which is secured to the guide-way 32. The follower is held against the cam by means of a spring 44 which bears against the bearing-block as shown in Figure 5, and tends to force this block to the right, and the lower end of the knife holder and guide-way to the left as viewed in this figure.

If the bearing-block were permanently fixed to the knife holder, the relative proportions of the crank-shaft and drum and the positions of the crank-shaft and drum axes being as shown in Figure 5, the crank would impart to the knife holder almost the motion desired. As viewed in Figure 5 the motion of both the cam 40 and the drum 5 is counterclockwise, and the knife holder is starting its descending stroke. Since we are ignoring for a moment the action of the cam, it will be seen that the crank will carry the knives downward, and then rock the knife holder in a counterclockwise direction at a speed which is almost, but not exactly equal to the angular speed of the drum itself.

In order to make the speed of these two parts exactly the same during this portion of the stroke, two cooperating expedients are used. The first is, of course, the action of the cam and follower, the cam being shaped to give the guide-way and the knife holder the same angular velocity as that of the drum during the latter part of the downward motion and the earlier part of the upward motion of the knife holder. The slight deviation from the natural movement of the crank which this involves is taken up by the lateral sliding of the bearing-block 37 against the compression of the spring 44.

Further to insure the exact equivalence of angular velocities between the two parts, in view of the eventual wearing of the cam or possible encrustations upon its surface, the knife holder is provided with a guide-roller 45 which is mounted slightly below the plane of the cutting edges of the knives 36. On the lower portion of the stroke of the knife holder this roller enters into channels 46 which are formed between fixed bosses 47 formed on the inner face of the drum 5. When the roller 45 is within one of these channels it will be seen that the drum, guide-way and knife holder are firmly interlocked, so that the knives 36 are aligned with the axis of the row of carriers which rests on the flat surface of the drum 5. The knife therefore enters the fruit perpendicularly, making a clean cut in its upper surface, engages the pit, and forces it through the elastic bottom of the rubber carrier or cup, through the hole 16 in the carrier link, and the aligned holes 49 in the drum into the interior of the drum itself. Here the pits are caught by a discharge chute 50 from which they drop clear of the machine. The fruits themselves are caught by a discharge apron 51, beneath which they may be collected in a suitably placed receptacle or they may be discharged onto a conveyer of any requisite type.

In order to insure that the knives withdraw cleanly and certainly from the fruit, there is preferably mounted to the guide-way above the carrier a stripper plate 52, which is perforated to permit the passage of the knives.

The form of knife shown, comprising a plurality of blades arranged in a star-shape, with the outer points of the star longer than the central portion where the blades join, has proved in practice to be very satisfactory. The knife enters the fruit easily and cleanly, and the arrangement of the blades is such as to tend to center the pit under the blade, forcing it out through the stem-end of the fruit. Any tendency for the fruit to stick to the knife and follow it up as the knife is withdrawn is obviated by the action of the stripper-plate which wipes the fruit off of the knife.

The shape of the knives is important to the results obtained, and different shapes are sometimes required for different fruits. Their form is not a part of this invention, however, as the present machine may be used with different numbers of blades arranged in star-shape, with parallel blades, with a group of needles or prongs acting as a knife. It is also possible to use hook clasps in the knife-holders which seize the pits and withdraw them instead of pushing them through.

What is herein claimed as new is:

1. A fruit pitting mechanism comprising a drum, means for rotating said drum at a substantially constant speed, a succession of carriers for receiving and positioning the fruit to be pitted mounted for movement with said drum and supported on the periphery thereof through a material arc of rotation, a guide-way mounted to oscillate about the axis of said drum, a knife-holder reciprocably mounted in said guide-way, means for reciprocating said knife-holder, interengaging means on said knife-holder and drum for directly interlocking said knife-holder and drum for rotation together with the knife-holder in alignment with a specific carrier in its arc of passage with said drum during the latter portion of the advance stroke and the earlier portion of the return stroke of said knife-holder, and means for oscillating said guide-way back into alignment with a succeeding carrier during the remainder of the cycle of reciprocation of said knife-holder.

2. A fruit pitting mechanism comprising a polygonal drum, means for rotating said drum at a substantially constant speed, a succession of carriers for receiving and positioning the fruit linked to form a chain passing over said drum, a guide-way mounted to oscillate about the axis of said drum, a knife-holder slidably mounted in said guide-way, a crank-shaft geared to said drum to rotate a number of times for each revolution of said drum equal to the number of faces and carrying a crank thereon, a journal for said crank on said knife-holder, means for interlocking said knife-holder and drum during that portion of the motion of said crank within which the knife-holder more closely approaches the drum in a position to align said knife-holder in perpendicularity with one of the drum surfaces, and means for oscillating said guide-way back into alignment perpendicularly with a succeeding surface of said drum during the remainder of the cycle of said crank.

3. A fruit pitting mechanism comprising a drum, means for rotating said drum, a succession of carriers for receiving and positioning the fruit to be pitted carried by said drum, each carrier being proportioned to subtend an aliquot part of the periphery of said drum, a guide-way mounted to oscillate about the axis of said drum, a knife-holder slidable in said guide-way, a crank-shaft carrying a crank and geared to rotate at as many times the speed of said drum as the number of aliquot parts whereinto the carriers divide the periphery thereof, a journal for said crank on said knife-holder, interengaging means on said knife-holder and drum for directly interlocking said knife-holder and drum during that portion of the motion of said crank within which the knife-holder more closely approaches the drum in a position to align said knife-holder in perpendicularity with one of the drum surfaces, and means for oscillating said guide-way back into alignment perpendicularly with a succeeding surface of said drum during the remainder of the cycle of said crank.

4. A fruit pitting mechanism comprising a drum, means for rotating said drum, a succession of carriers for receiving and positioning the fruit to be pitted carried by said drum, each carrier being proportioned to subtend an aliquot part of the periphery of said drum, a guide-way mounted to oscillate about the axis of said drum, a knife-holder slidable in said guide-way, a crank-shaft carrying a crank and geared to rotate at as many times the speed of said drum as the number of aliquot parts whereinto the carriers divide the periphery thereof, a journal for said crank on said knife-holder, a plurality of radial channels formed on said drum, means on said knife-holder for engaging the one of said channels momentarily in alignment with said guide-way during the portion of the movement of said crank when said knife-holder more closely approaches said drum, and means operating synchronously with the movement of said crank for oscillating said guide-way into alignment with successive channels as the drum advances.

5. A fruit pitting mechanism comprising a drum, means for rotating said drum, a succession of carriers for receiving and positioning the fruit to be pitted carried by said drum, each carrier being proportioned to subtend an aliquot part of the periphery of said drum, a guide-way mounted to oscillate about the axis of said drum, a knife-holder slidable in said guide-way, a crank-shaft carrying a crank and geared to rotate at as many times the speed of said drum as the number of aliquot parts whereinto the carriers divide the periphery thereof, a journal for said crank on said knife-holder, a cam mounted on said crank-shaft, a cam-follower mounted on said guide-way, said cam being proportioned to oscillate said guide-way with a motion equal to that of said drum during the portion of the movement of said crank wherein the knife-holder more closely approaches said drum and to reverse the motion of said guide-way during the remainder of the crank cycle, and interengaging means on said knife-holder and drum for rigidly and directly interlocking said knife-holder and drum during the period of their joint motion.

6. A fruit pitting mechanism comprising a drum, means for rotating said drum, a succession of carriers for receiving and positioning the fruit to be pitted carried by said drum, each carrier being proportioned to subtend an aliquot part of the periphery of said drum, a guide-way mounted to oscillate about the axis of said drum, a knife-holder slidable in said guide-way, a crank-shaft carrying a crank and geared to rotate at as many times the speed of said drum as the number of aliquot parts whereinto the carriers divide the periphery thereof, a journal for said crank mounted on the end of said knife-holder and slidable with respect thereto in a direction transverse to said guide-way, a cam mounted on said crank-shaft and a cam-follower mounted on said guide-way said cam being proportioned to oscillate said guide-way with an angular velocity equal to said drum and in the same direction during that portion of the movement of said crank wherein the knife-holder more closely approaches said drum and to reverse the motion of said guide-way during the remainder of the crank cycle, and resilient means operating between said knife-holder and said slidably mounted journal for holding said follower against said cam.

7. A fruit pitting mechanism comprising a drum, means for rotating said drum at a substantially constant speed, a succession of carriers for receiving and positioning the fruit to be pitted mounted for movement with said drum and supported on the periphery thereof through a material arc of rotation, a guide-way mounted to oscillate about the axis of said drum, a knife-holder reciprocably mounted in said guide-way, means for reciprocating said knife-holder, interengaging means on said knife-holder and drum for directly interlocking said knife-holder and drum for rotation together with the knife-holder in alignment with a specific carrier in its arc of passage with said drum during the latter portion of the advance of the advance stroke and the earlier portion of the return stroke of said knife-holder, and means for oscillating said guide-way back into alignment with a succeeding carrier during the remainder of the cycle of reciprocation of said knife-holder and releasing said interengaging means from interlocking the drum and knife-holder.

8. A fruit pitting mechanism comprising a drum, means for rotating said drum at a substantially constant speed, a succession of carriers for receiving and positioning the fruit to be pitted mounted for movement with said drum and supported on the periphery thereof through a material arc of rotation, a guide-way mounted to oscillate about the axis of said drum, a knife-holder reciprocably mounted in said guide-way, means for reciprocating said knife-holder, interengaging means on said knife-holder and drum for directly interlocking said knife-holder and drum for rotation together before the fruit is pitted with the knife-holder in alignment with a specific carrier in its arc of passage with said drum during the latter portion of the advance stroke and the earlier portion of the return stroke of said knife-holder, and means for oscillating said guide-way back into alignment with a succeeding carrier during the remainder of the cycle of reciprocation of said knife-holder and releasing said interengaging means from interlocking the drum and knife-holder.

9. A fruit pitting mechanism comprising unitary rotary means for simultaneously moving and supporting a succession of carriers disposed in spaced relation for receiving and positioning the fruit to be pitted and mounted for movement with said rotary means and supported through a material arc of rotation thereof, a guideway mounted to oscillate about an axis of said rotary means, a knife holder reciprocably mounted in said guideway, means for reciprocating said knife holder, interengaging means on said knife holder and said rotary means for directly interlocking said knife holder and rotary means for movement together with the knife holder in alignment with a specific carrier in its arc of passage with said rotary means during the latter portion of the advance stroke and the earlier portion of the return stroke of said knife holder, and means for oscillating said guideway back into alignment with a succeeding carrier during the remainder of the cycle of reciprocation of said knife holder.

HERSCHEL M. CONNOR.
ELLSWORTH W. CARROLL.